United States Patent
Bevan et al.

(10) Patent No.: US 7,805,463 B2
(45) Date of Patent: Sep. 28, 2010

(54) THREE-DIMENSIONAL TOPOLOGY BUILDING METHOD AND SYSTEM

(75) Inventors: Timothy D. C. Bevan, Cambridge (GB); Michael J. Martin, Ashburn, VA (US); Paul J. Watson, Cambridge (GB)

(73) Assignee: Laser-Scan, Inc., Sterling, VA (US)

( * ) Notice: Subject to any disclaimer, the term of this patent is extended or adjusted under 35 U.S.C. 154(b) by 397 days.

(21) Appl. No.: 12/117,576

(22) Filed: May 8, 2008

(65) Prior Publication Data

US 2008/0281839 A1 Nov. 13, 2008

Related U.S. Application Data

(60) Provisional application No. 60/924,303, filed on May 8, 2007.

(51) Int. Cl.
G06F 7/00 (2006.01)
G06F 17/30 (2006.01)

(52) U.S. Cl. ...................................... 707/803

(58) Field of Classification Search ................. 707/790, 707/803; 703/10; 345/475; 702/2, 158
See application file for complete search history.

(56) References Cited

U.S. PATENT DOCUMENTS

| | | | |
|---|---|---|---|
| 5,844,563 A | 12/1998 | Harada et al. | |
| 6,128,577 A * | 10/2000 | Assa et al. | 702/2 |
| 6,982,710 B2 | 1/2006 | Salomie | |
| 7,379,936 B2 * | 5/2008 | Kothuri et al. | 1/1 |
| 2004/0193566 A1 * | 9/2004 | Kothuri | 707/1 |
| 2004/0220788 A1 * | 11/2004 | Assa et al. | 703/10 |
| 2005/0015216 A1 * | 1/2005 | V. Kothuri | 702/158 |
| 2005/0203932 A1 * | 9/2005 | Kothuri et al. | 707/100 |

(Continued)

OTHER PUBLICATIONS

Kingsley E. Hayness et al., "Gravity and Spatial Interaction models". 1984.*

(Continued)

*Primary Examiner*—Hung T Vy
(74) *Attorney, Agent, or Firm*—Miles & Stockbridge P.C.; David R. Schaffer, Esq.

(57) ABSTRACT

This patent application is for a method and system that takes any arbitrary pre-existing geometric data and builds ISO 19107 compliant 3-Dimensional (3D) topology rather than requiring an incremental build of the topology. In accordance with at least one embodiment of the present invention, a method for integrating a three-dimensional feature geometry into a three-dimensional topology in a database includes adding a three-dimensional feature geometry into a table in a database; passing the three-dimensional feature geometry to a three-dimensional topology engine and a cache; performing a spatial refinement to determine a number of topology primitives in an existing three-dimensional geometry in the database that are near to topology primitives of the three-dimensional feature geometry; obtaining a number of relevant nearby spatial topology primitives in the geometries using a spatial search; performing an interaction refinement to determine a precise set of the number of relevant nearby topology primitives in the geometries that have spatial interactions; determining a common section of each topology primitive in the number of relevant nearby topology primitives that have spatial interactions; validating that the three-dimensional feature geometry fits into the three-dimensional topology table using a plurality of rules; and saving the validated three-dimensional feature geometry in the database.

31 Claims, 6 Drawing Sheets

U.S. PATENT DOCUMENTS

2007/0132767 A1* 6/2007 Wright et al. ............... 345/475

OTHER PUBLICATIONS

Wikipeida, "Spatial analysis".*
International Application No. PCT/US2008/063099—PCT International Search Report and Written Opinion of the International Searching Authority mailed Sep. 2, 2008.

http://www.oracle.com/database/index.html, "Database 10g | Oracle Database—The First Database Designed for Grid Computing", May 7, 2007, pp. 1-2.

http://www.oracle.com/technologies/grid/index.html, "Oracle Grid Computing", May 7, 2007, pp. 1-2.

* cited by examiner

THREE-DIMENSIONAL TOPOLOGY BUILDING METHOD AND SYSTEM

CROSS-REFERENCE TO RELATED APPLICATIONS

This application claims benefit of priority to U.S. Provisional Patent Application No. 60/924,303, filed May 8, 2007 and which is herein incorporated in its entirety by reference.

GOVERNMENT LICENSE RIGHTS

The U.S. Government has a paid-up license in this invention and the right in limited circumstances to require the patent owner to license others on reasonable terms as provided for by the terms of Small Business Innovation Research (SBIR) Contract Nos. W9132V-04-C-0013, W9132V-04-C-0027, W9132V-07-C-004, W9132V-07-P-0004 and W9132V-08-C-0009 awarded by the U.S. Army Corps of Engineers, Engineering Research & Development Center, Topographic Engineering Center.

FIELD OF THE INVENTION

Embodiments of the present invention relate to a system and method for building a three-dimensional (3D) topology model, and more particularly to a system and method for building an ISO 19107 compliant 3D topology model from a 3D feature geometry.

BACKGROUND

The integration of spatial information into relational database management systems continues to develop both in scope and scale to provide users (for example, application developers, data providers and data users) the ability to explore new opportunities requiring the analysis of multi-dimensional data. In the past, the spatial world thought it only needed to be two dimensional (2D) to support the needs for effective data representation and display. In certain cases, an ability to assign a Z-coordinate value to a specific coordinate or series of coordinates would be described as 3D data. However, while the typical approach of integrating a 2D model with a 3D surface representation, which is commonly known as a two and a half dimensional (2.5D) representation, works for many categories of queries, it is not accurate for true 3D data that can support volumetric analysis.

The volumetric character of data often becomes important when considering detailed, through-space interactions between features, such as the interactions that occur in urban environments or complex navigational planning. Volumetric models are the most complex and most expressive tools available for describing interactions in the real world.

As a result, the need for and ability to analyze and manipulate true 3D data is rapidly increasing. Unfortunately, existing geographic information systems (GIS) functionality only provides for data analysis, structuring, management and presentation of 2D and 2.5 D data. Similar capabilities operating within a true 3D topology model will allow application developers to better serve users of spatial information and expand the areas and complexities associated with modeling and analyzing real world data. For example, 3D urban planning, defense, medical analysis, monitoring of complex environmental factors, telecommunications, management of utility assets, mining and underground detection are just a sample of pursuits that stand to benefit from the availability of a true 3D model.

SUMMARY

Embodiments of the present invention pertain to systems and methods for building a true three-dimensional (3D) topology model from a 3D feature geometry.

BRIEF DESCRIPTION OF THE DRAWINGS

Non-limiting and non-exhaustive embodiments of the present invention are described with reference to the following figures, wherein like reference numerals refer to like parts throughout the various views unless otherwise precisely specified.

DESCRIPTION OF VARIOUS EMBODIMENTS OF THE INVENTION

In accordance with one or more embodiments of the present invention, effective and efficient interaction with true 3D data requires a model that can leverage the value of topology information and feature geometries by integrating the two sets of information. Topology is a branch of mathematics that describes the properties of geometric figures that are invariant under continuous deformation of the embedding coordinate space. The use of topology in computational geometry accelerates spatial query operations such as computing containment or overlap relationships.

In accordance with one or more embodiments of the present invention, the logical process for building an ISO 19107 compliant 3D topology model from 3D feature geometry may include (i.e., comprise) a series of individual steps, which are described below, and each of which, generally, depends on a set of core system capabilities. The combination of these capabilities leads to a validated, self-consistent model that provides a 3D topology engine with broad capacity for re-use. The model is capable of storing simple and complex 3D topologies and can handle any number of different data sets and not require any modification to the model or the data set.

In accordance with one or more embodiments of the present invention, to characterize the spatial relationships addressed by the 3D model, all 81 Boolean and all 19,683 Egenhofer intersection patterns are implemented in the model. It is this capability that forms the foundation for determining the spatial relationships between two features and records whether the intersection relations between their parts (for example, interior, exterior, boundary) are empty or not. Typical patterns that may be implemented may include, but are not limited to, adjacency, intersection, containment, overlap, and equals.

Adjacency is a measure of how close geometric objects are to each other. Intersection measures whether two geometric objects intersect and, if so, where. Containment measures whether one geometric object is contained within another geometric object. Overlap measures by how much two geometric objects have areas that overlap each other. Equals measures whether two geometric objects are equal to each other.

Figure 1:
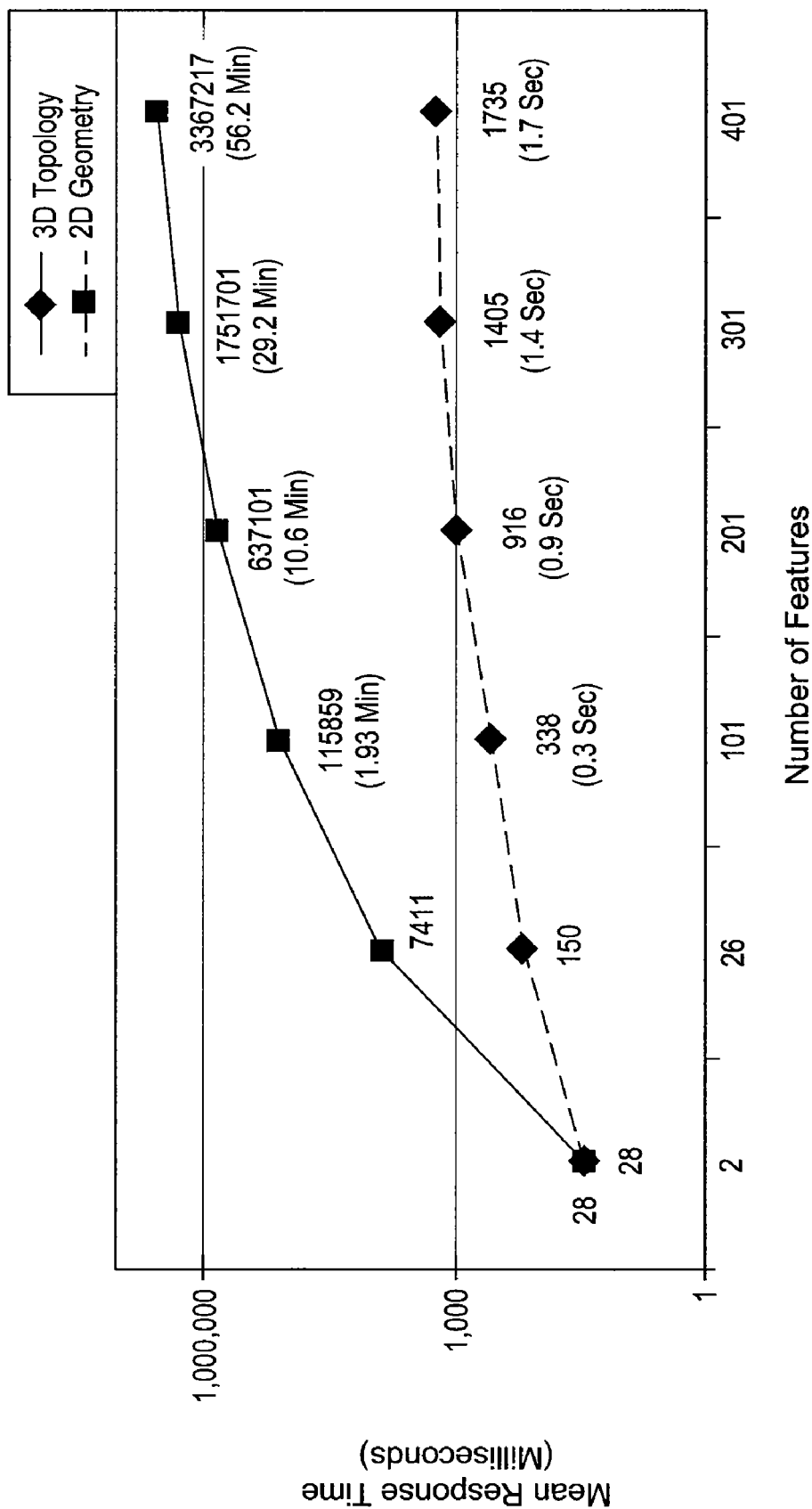
FIG. 1 is a logarithmic chart showing a query response time performance comparison between a current two-dimensional (2D) geometry and a 3D topology, in accordance with an embodiment of the present invention.

Another benefit of the 3D topology over the 2D geometries is that there is a significant increase in query speed using the 3D topology over performing queries on 2D geometries stored as topological primitives, in accordance with embodiments of the present invention. FIG. 1 is a logarithmic chart showing a performance comparison between a current 2D geometry and a 3D topology model, in accordance with an embodiment of the present invention. In FIG. 1, the results shown are for finding all intersecting objects using a TOUCH command for the 2D geometry and using an INTERSECT command for the 3D topology model. As seen in FIG. 1, although there is no performance difference when only 2 features are searched, the difference in performance quickly becomes apparent when more than 2 features are searched. For example, when only 26 features are searched, the 3D topology query response time is over 49 times faster and, when 401 features are searched, the 3D topology model query response time is over 1940 times faster.

The implementation approach for the 3D topology engine generally enables the engine to work independently of the database, to be both client- and database-independent. It is designed to operate with either a "smart" client (i.e., one that has an understanding of topology and its own topology storage model) or a "dumb" client, that is, one without an understanding of topology and its own topology storage model.

Figure 2:
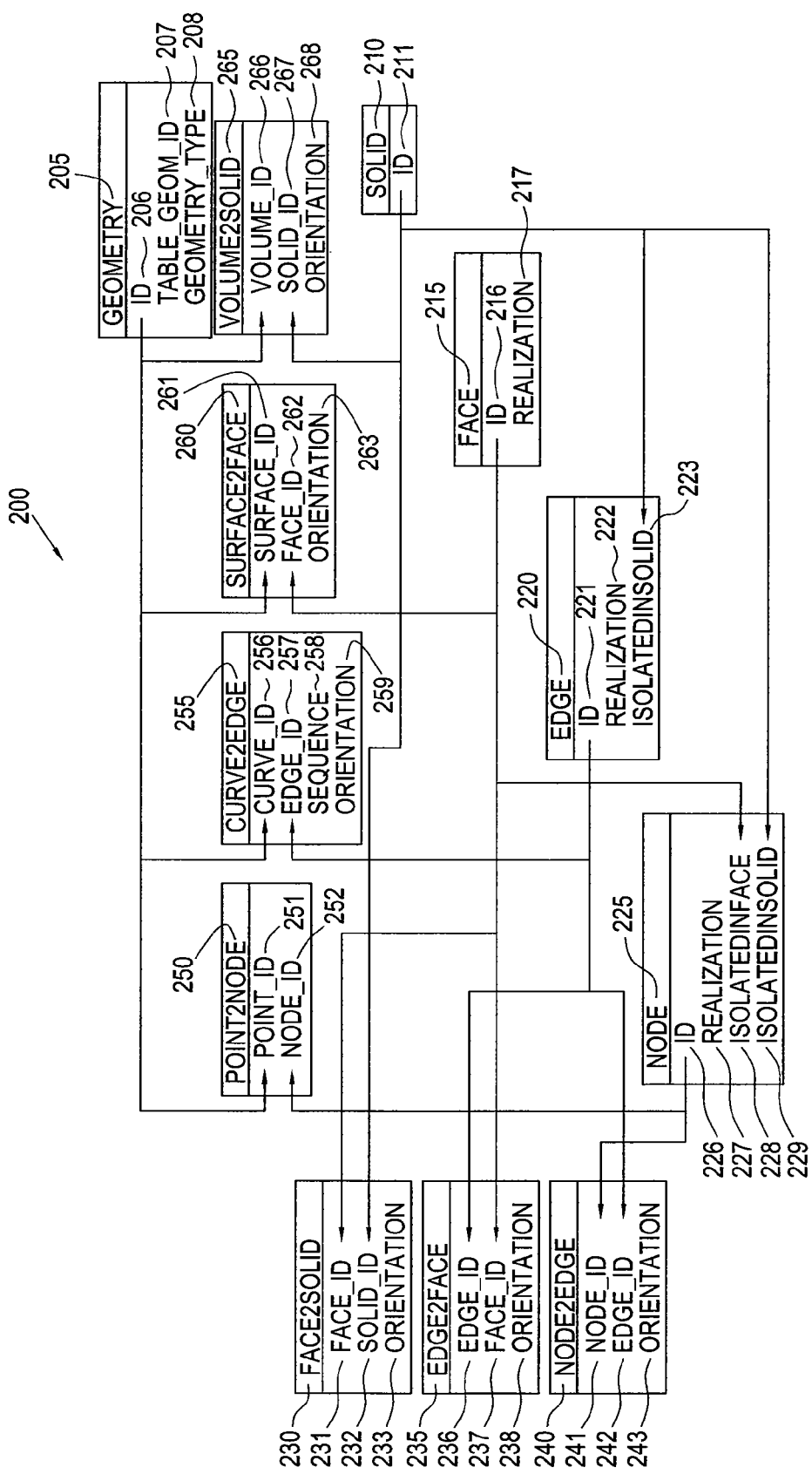
FIG. 2 is a 3D topology model, in accordance with an embodiment of the present invention.

FIG. 2 is a 3D topology model, in accordance with an embodiment of the present invention. In FIG. 2, the structure and relationships between elements (i.e., tables) in a topology model 200 as well as how a geometry library 205 relates to the model. For example, the topology model 200 may include a data structure of inter-related tables and a geometry library 205 that may include an identification (ID) field 206, a table geometry ID field 207 and a geometry type field 208.

FIG. 2 may also include four tables that define the topological features (i.e., topology primitives) of the 3D topology and these are the most basic components of the 3D topology. A first of these may be a solid table 210 that may include a solid ID field 211. A second table may be a face table 215 that may include a face ID field 216 and a face realization field 217. A third table may be an edge table 220 that may include an edge ID field 221, and edge realization field 222, and an isolated in solid field 223. Finally, a node table 225 may include a node ID field 226, a node realization field 227, an isolated in face in field 228, and an isolated in solid field 229.

In FIG. 2, the topology model 200 may also include three tables to specify relationships between the topological features in the prior tables. A first table is a face2solid table 230 that may include a face ID field 231 that is a pointer to/from face ID field 216, a solid ID field 232 that is a pointer to/from solid ID field 211 and a face to solid orientation field 233 that identifies the orientation of the face in the solid. A second table is an edge2face table 235 that may include an edge ID field 236 that is a pointer to/from edge ID field 221, a face ID field 237 that is a pointer to/from face ID field 216 and an edge to face orientation field 238 that identifies the orientation of the edge in the face. The third table may include a node2edge table 240 that may include a node ID field 241 that is a pointer to/from node ID field 226, an edge field 242 that is a pointer to/from edge ID field 221 and an node to edge orientation field 243 that identifies the orientation of the node in the edge.

The topology model in FIG. 2 may also include four tables that specify the relationships between the topological features in the prior tables and the features of the geometry library 205. A first table is a point2node table 250 that may include a point ID field 251 that is a pointer to/from Geometry ID field 206 in geometry 205, a node ID field 252 that is a pointer to/from node ID field 226. A second table is a curve2edge table 255 that may include a curve ID field 256 that is a pointer to/from Geometry ID field 206 in geometry library 205, an edge ID field 257 that is a pointer to/from edge ID field 221, a sequence field 258 and a curve to edge orientation field 259 that identifies the orientation of the curve in the edge. A third table is a surface2face table 260 that may include a surface ID field 261 that is a pointer to/from Geometry ID field 206 in geometry library 205, a face ID field 262 that is a pointer to/from face ID field 216 and a surface to face orientation field 263 that identifies the orientation of the surface in the face. A fourth table is a volume2solid table 265 that may include a volume ID field 266 that is a pointer to/from Geometry ID field 206 in geometry library 205, a solid ID field 267 that is a pointer to/from solid ID field 211 and an orientation field 268 that identifies the orientation of the volume in the solid.

Figure 3:
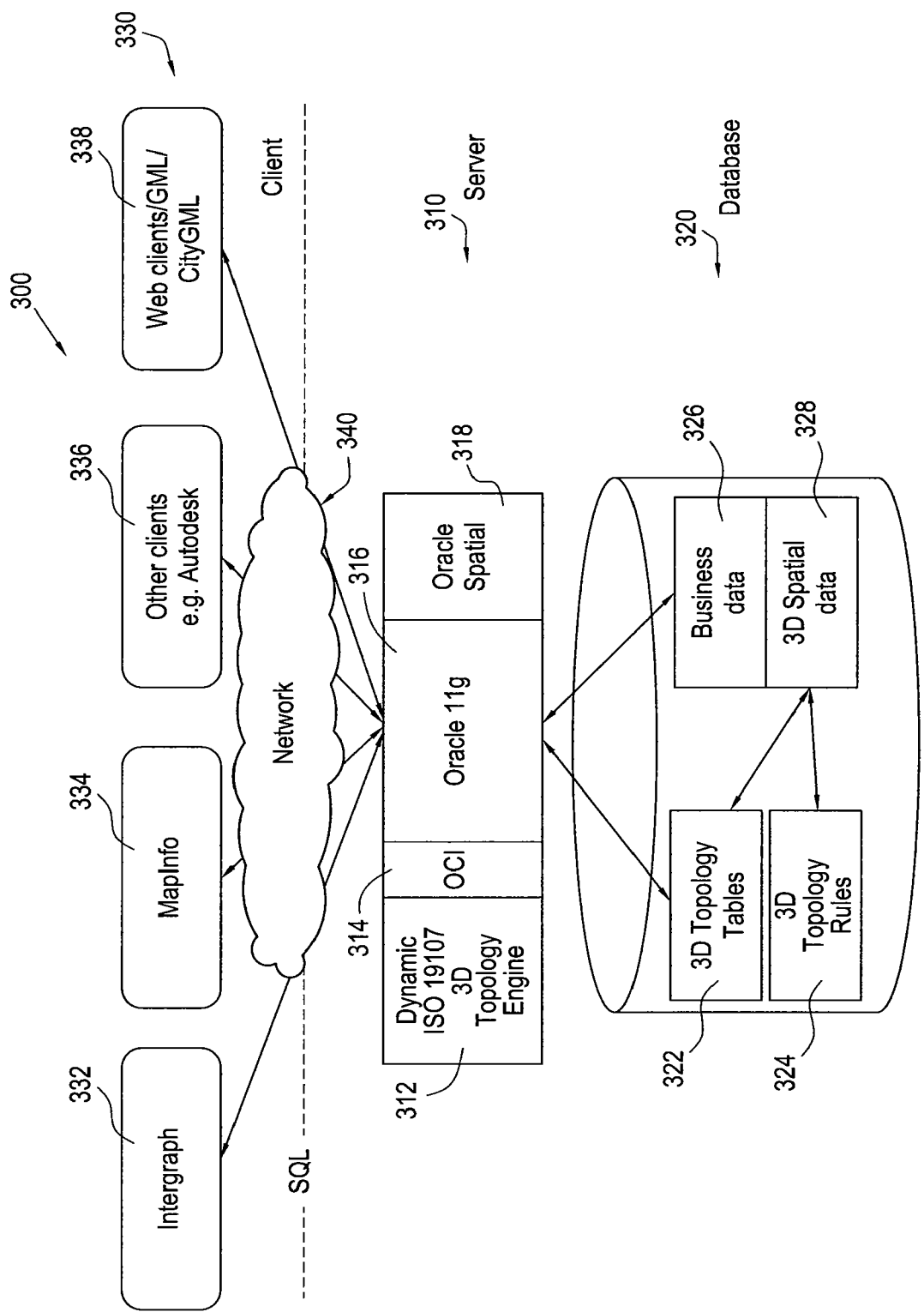
FIG. 3 is a system architecture of a 3D topology model, in accordance with an embodiment of the present invention.

FIG. 3 is a system architecture of a 3D topology model, in accordance with an embodiment of the present invention. In FIG. 3, the system architecture 300 may include a server 310, for example, but not limited to, a database server. The system may also include a database storage system 320, where the database server 310 is configured to communicate with the database storage system 320 and also with a variety of client systems 330 over a communications network 340. Communications network 340 may include, but is not limited to, a hardwired and/or wireless local area network (LAN), a hardwired and/or wireless wide area network (WAN), the Internet, and the like. The client systems 330 may include, but are not limited to, an Intergraph client 332, a MapInfo client 334, other clients 336 (e.g., Autodesk client), and a variety of web clients 338 (e.g., GML and CityGML), generally implemented on separate computer systems, for example, but not limited to, personal computers, laptop computers, workbook computers, and the like.

In FIG. 3, the server 310 may include a dynamic 3D topology engine 312 that is ISO 19107 compliant and may be in communication with a communication interface 314, for example, but not limited to, an Oracle call interface (OCI). The communication interface 314 enables communication between the 3D topology engine 312 and a relational database management system (RDBMS) 316 (e.g., an Oracle 10g and/or an Oracle 11g database from Oracle Corporation, Redwood Shores, Calif.), which may include and/or be in communication with a spatial extension 318, for example, but not limited to, an Oracle Spatial Extension to the Oracle system that provides advanced spatial features to support high-end geographic information systems (GIS) and location-based services (LBS) solutions. RDBMS 316 may act as the interface between the clients 330, the 3D topology engine 312, and the database 320.

In FIG. 3, the database 320 may include 3D topology tables 322, 3D topology rules 324, business data 326, and 3D spatial data 328. The 3D topology tables 322 are in two-way communication with the RDBMS 316 and the 3D spatial data 328. The 3D topology rules 324 are also in communication with the 3D spatial data 328. The RDBMS 316 is also in communication with the business data 326.

In accordance with one or more embodiments of the present invention, the system specifications for the equipment and software used to implement one or more embodiments of the present invention may include personal computer (PC) and/or higher servers with sufficient disk space and processor/multi-processors and sufficient processing capabilities and speed to handle the creation of the 3D topology models, a relational database management system (RDBMS) with spatial data handling capabilities and utilities, and communications equipment to enable workstations and/or PCs to access the RDBMS database.

In accordance with at least one embodiment of the present invention, the following configurations may be used to run the system. For example, for a client system, a Windows 2000/XP operating system (OS) may be installed on a machine with a 1.5+ GHz processor with 512 megabyte (MB) RAM, an 80 gigabyte (GB) hard drive, an Ethernet connection, an embedded Oracle client, and a 30-90 MB memory for each instance of the topology engine (if the application is running with a smart client). For a database server, a Windows 2000/XP OS may be installed on a 2+ GHz processor with 1.5 GB RAM, an Ethernet connection, a 10+ GB hard drive, an Oracle 10g or 11g database, an Oracle Enterprise Edition with Spatial, an Oracle External Procedure Agent, a Server PL.SQL packages and dll/shared objects installed on the server database, and a 30-90 MB memory for each instance of the topology engine (if the application is running on a server). For a communications system, a standard Internet connection may be implemented using an 100 MB router and CAT Ethernet cables.

Figure 4:
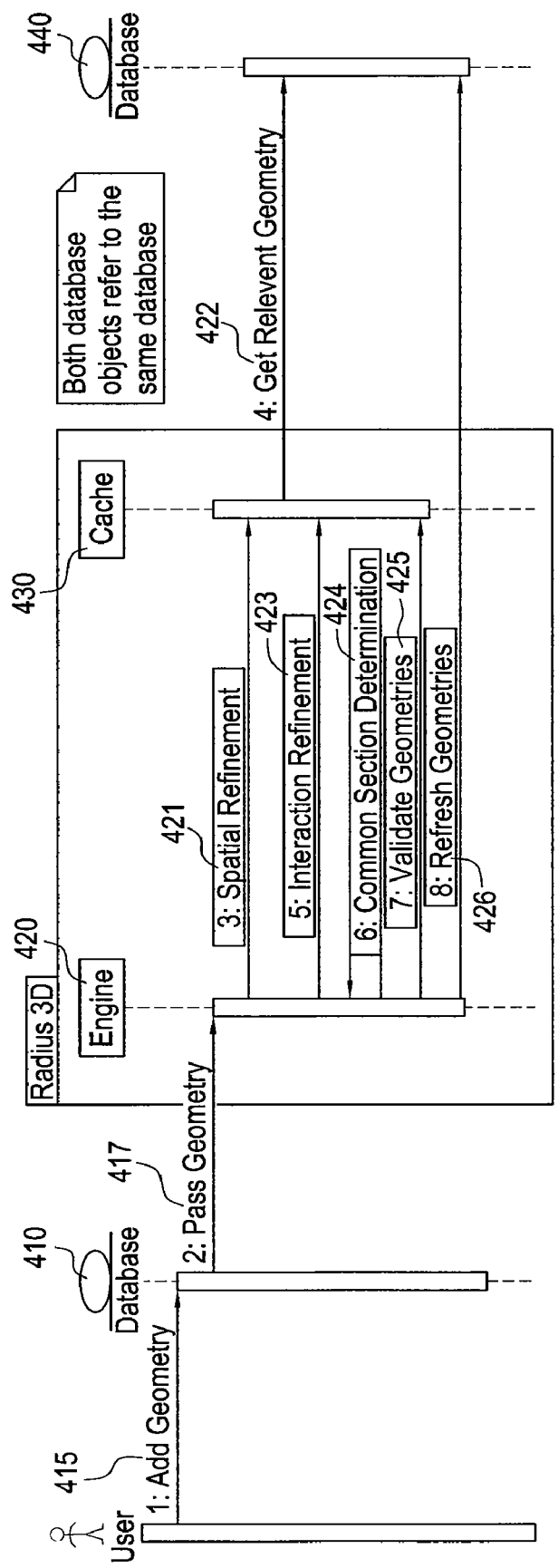
FIG. 4 is a functional process diagram of an implementation of a 3D topology builder using a dumb client without an internal topology storage model, in accordance with an embodiment of the present invention.

FIG. 4 is a functional process diagram of an implementation of a 3D topology builder using a client without an internal topology storage model, in accordance with an embodiment of the present invention. In accordance with one or more embodiments of the present invention, in a client without topology, which may also be referred to as a "dumb" client, a database 410 may receive 415 a user-supplied 3D feature geometry and call 417 a 3D topology engine 420 to integrate the 3D feature geometry 415 into the topology. The 3D topology engine 420 may be implemented using specially created software, as well as commercially available software, for example, but not limited to, a Radius Topology program provided by 1 Spatial, from Cambridge, United Kingdom. The Radius Topology program is an open standards, advanced spatial processing environment that cleans the user-supplied 3D feature geometry 415, maintains data integrity, protects existing data from inaccuracies, and enhances query performance in an Oracle database environment and is interoperable with numerous GIS applications.

In FIG. 4, the 3D topology engine 420 may perform the following process, starting with a spatial refinement 421 of the user-supplied 3D feature geometry, using a cache 430. As part of the spatial refinement 421, relevant geometries may be requested 422 from a database 410 for comparison with the user-supplied 3D feature geometry to determine general spatial relationships between the features (i.e., topology primitives) in the geometries. These general spatial relationships may include actual interactions, as well as, interactions that fall within a predetermined or predefined tolerance range (i.e., distance from each other). Generally, in this and other embodiments with the dumb client, database 440 is the same as database 410. Once the general spatial relationships between the topology primitives in the geometries is determined, their actual interactions may be refined 423 to determine which topology primitives have actual (i.e., concrete) spatial interactions or at least are within a specified tolerance range to permit them to be associated with each other. The common section of each topology primitive that is affected by each interaction may be individually determined 424. This determination 424 may be done using an iterative routine to check each topology primitive affected by each interaction.

In FIG. 4, after the shared geometry sections are determined 424, how the user-supplied 3D feature geometry fits into the existing topology in the database 410 may be validated 425 using a variety of rules to adjust the user-supplied 3D feature geometry and to ensure that all feature geometries are valid. The validation 425 may include the creation and storage of new topological primitives and binding the new topology primitives to both new and existing features. Once the geometries have been validated 425, the geometries may be refreshed 426 by saving the changes that have been made in the cache 430 to the database 440.

In accordance with one or more embodiments of the present invention described herein, the topology engine may utilize a cache to increase performance and reduce the number of queries to the database. It may also provide a level of transactional control where the results of the creation of topology occur in the cache before being flushed (i.e., saved) to the database. A more detailed description of the process shown in FIG. 4 is provided below.

Add and/or Modify 415 a Feature Geometry. In accordance with at least one embodiment of the present invention, the process may begin by adding 415 a new feature geometry for inclusion in the model. To represent this geometry an Oracle Spatial based geometry model (SDO_GEOMETRY), for example, as supplied by Oracle Corporation of Redwood Shores, Calif., in the 11g database, may be used. This database uses an adaptation of the ISO 19125 Simple Feature Multi-Polygon geometry class to store a simple triangulated surface and acts as the principle generalized surface representation within the system. Similarly, the representation of point (0-dim) and line (1-dim) geometry may use the standard ISO Simple Feature classes for geometry storage. This capability underpins the spatial representation of both feature geometry and the geometric realization of topological primitives such as nodes, edges and faces. In general, solids are not explicitly realized but are defined by reference to their bounding shells, which are composed of faces realized by surface geometries. This is analogous to the conventional representation of a 2D polygon, which is, by its boundary rings, expressed using closed curve geometries. The current Oracle enterprise database (11g) database may also be used, in accordance with some embodiments of the present invention. The Oracle enterprise database (11g) contains support for 3D geometry, including a standardized data structure representing a triangulated irregular network (TIN) composed of a triangulated surface and a set of break lines, which constrain it. Also included is an explicit solid modeling data structure based on a tetrahedral primitive. This completes the logical sequence of linearly interpolated geometry primitives within Oracle Spatial Point (0-dim), LineString (1-dim), TIN (2-dim) and Tetrahedral Solid (3-dim).

When the user creates/adds 415 a new geometry or modifies an existing geometry, triggers on the feature tables may initiate the creation and updating of the underlying topology.

To avoid the introduction of a mutating table, the triggers may create a log indicating that the geometry has been updated and a separate log indicating that the topology needs to be updated. The triggers may then query the log table to find created and modified geometries and send the collection of geometries to the 3D topology engine for topology creation.

In accordance with at least one embodiment of the present invention, a system may enable a "dumb" client to insert an SDO_GEOMETRY into a database table and then have the database integrate the geometry into the topology, snapping where required. In accordance with at least one embodiment of the present invention, additional interfaces may include: inserting a feature into the database by specifying the geometry as a set of topological primitives; "semi-dumb" clients can submit these features and the database will generate a geometry from the specified topology. The list of primitives could be specified in the SDO_GEOMETRY to avoid additional interfaces.

In accordance with at least one embodiment of the present invention, the system may allow an intelligent client to perform the computations and update the topology and features, however, this will involve disabling the triggers. The database side, generally, will provide the transactional consistency, so that data is not committed that will corrupt the updates from other sessions. The use of this interface is intended to be the same code as is in the engine 420. That should have an interface for applications to use to set geometries or set the primitives.

Spatial Refinement 421. Once the feature geometry is presented to the system, the topology engine 420 may identify clearly any nearby features to which the presented geometry should be related through topology. A comparison of all possible 3D geometries present in the system (full table scan) is time-consuming and wasteful. Therefore, in accordance with the current embodiment of the present invention, the search may be optimized by adopting a two-phase approach. For example, to minimize the number of geometries, the additional geometry may be buffered using a spatial search. Currently, Oracle provides the capabilities to search spatially in the third dimension.

In accordance with at least one embodiment of the present invention, the first search may be done by querying the cached data for all features in a minimum bounding box (MBB) of the original geometry. This query will, generally, return not only strict spatial interaction but also "near misses", i.e., objects that could be said to interact within some tolerance. Therefore, when compiling the query the source geometry will be expanded by the tolerance distance, contained within the topology (node formation) rules, before searching for interaction candidates. This set may be later refined with additional detailed geometric checks (see below).

In accordance with at least one embodiment of the present invention, the search above may be further optimized by using a spatial index structure, which can quickly narrow down to a small set of potentially spatially interacting objects. The Oracle database, in general, contains an implementation of a hierarchical R-tree (rectangle tree) index, which is suitable for both 2D and 3D geometric data. In this structure, each geometry may be recorded in the index against its Maximum Bounding HyperSolid (MBH) (a rectangle in 2D and a cuboid in 3D). Unfortunately, while the index can store 3D data, the query operators (e.g., intersects, overlaps etc.), which return feature rowsets, apply all their processing in 2D only (X-Y) with the exception of the filter query. The filter query simply returns all rows in which MBH intersects the MBH of the source geometry without checking whether the objects actually approach. This is useful when objects are small and compact (aspect ratios near 1:1). However, when objects are large or extended (e.g., a river) then the filter query may return a large number of distant objects that may need to be discarded.

Interaction Refinement 423. In accordance with at least one embodiment of the present invention, once the raw set of topology primitives that are candidates for snapping have been identified, it may be refined to the precise set in which concrete spatial interactions or those within a specified tolerance are known to be present. In general, for all features in this set, a modification to the underlying topology is performed. Later snapping (i.e., forcing geometric features together when they are determined to be within a predetermined distance from each other) may also cause this set to be re-evaluated. To minimize the number of geometries, the additional geometry, generally, will be buffered using a spatial search. Currently, Oracle provides the capabilities to search spatial in the third dimension. Additional capabilities may be created or used in the topology builder application to increase performance.

Common Section Determination 424. Once the precise set of interacting topology primitives has been identified, the portion of each primitive that is affected by the interaction needs to be determined. 2D topology builders use an "approach point" algorithm to find the paired points (which define the common segments) at which two geometries come within tolerance and can be considered to be the same. However, in 3D these common points become potentially a number of rings. The 3D topology engine computes these rings using a "touchpoint" algorithm based on the geometrical intersection of adjusted versions of the geometries, and hence computes the common regions. A second refinement to determine whether the nearby geometries provided from the previous spatial refinement may further separate candidate geometries. This set of candidate geometries may be used to compare the new geometry and find the common section determination. Currently, Oracle provides similar functionality in two dimensions, but not in three dimensions. This functionality will reside in the topology engine 420 due to the availability of three dimensional geometry libraries and increased performance.

Validate Geometries 425. Once the shared geometry sections are known, the impact on the originally supplied feature geometry may be considered. Generally, the supplied feature geometry will not marry perfectly into the existing topology complex, and therefore there may need to be some snapping of the supplied geometry parts to the topology complex. As a result, the section of the originally supplied geometry that corresponds to the new shared geometry section must be derived and replaced. The topology primitives may then be stored back into the database cache 430 using existing topology primitives where appropriate and creating new ones where required.

The topology builder may snap feature geometries based on user-defined tolerances. In general, the tolerances describe the relationships between feature objects including a buffer to determine when to adjust feature geometry to share topology.

Validation rules. In accordance with some embodiments of the present invention, the following is a minimal set of rules that the comprehensive topology validation component should implement:

All solids are closed.

All faces are closed, and none have infinite loops.

All previous and next edge pointers are consistent.

All edges meet at nodes.

Each isolated node is associated with a face or solid.

All faces on a solid boundary are associated with the solid.

All edges on a face boundary are associated with the face.

Each isolated edge is inside the boundary of its associated face or is isolated within a solid.

No face intersects itself or another face.

No edge intersects itself or another edge.

Start and end coordinates of edges match coordinates of nodes exactly.

These internal checks should include verification of all pointers to exclude dangling or null pointers and other referential errors.

Primitive Creation. The process of validating the geometries may result in the creation of new topological primitives, as well as the modification of existing ones. In general, this will be done using the established storage model for database schema and conventional SQL for database access.

Cached Feature Geometry. Typically, methods are provided within the system to generate the geometry from the geometries of the stored topological primitives. These are known as functional geometries. For complex, dense or extended features, this calculation may be costly and negatively impact operations in which the access to geometric information is time critical (e.g., map redraw).

To increase database performance and avoid the cost of always rebuilding feature geometry for complex, dense or extended features from topological primitives, the data tables may store a static (or cached) copy of the feature geometry created from the topological data. As the topology primitives are modified, the feature geometries, which depend upon these primitives, may also be updated to include the synchronized version obtained via the functional geometry method described above.

Feature to Primitive Binding. After the newly created and modified topology primitives are stored, the bindings of the new topology primitives back to both new and existing features are generally established to maintain navigability for later spatial and topological query. An ISO 19107 compliant topology model, such as seen in FIG. 2, may provide the storage of the primitives and the primitive to feature binding.

Refresh Geometries 426. In general, the final step is the flushing (i.e., saving and/or storing) of the changes in the cache to the persistent database. One of the purposes of the cache is to assist in transactional integrity by allowing an area where the new topology may be built and validated before making changes to the shared persistent database. Having this cache greatly simplifies the locking mechanism required when the database updates are made and helps guarantee transactional consistency.

Transactional Consistency. A key design principle of the 3D topology engine is that the entire system, consisting of feature geometry, topology primitives and boundary relationships, moves in discrete steps from one consistent and valid state to another. Generally, at no point does the database contain committed data in an intermediate or partially valid state.

If data (primitives) are modified before the calculation is complete, incorrect results may be generated. For example, if two processes attempt to add crossing lines at exactly the same time, they will not see the results of the other. As a result, two intersecting edges will be incorrectly produced, rather than four edges ending at the intersection point.

Figure 5:
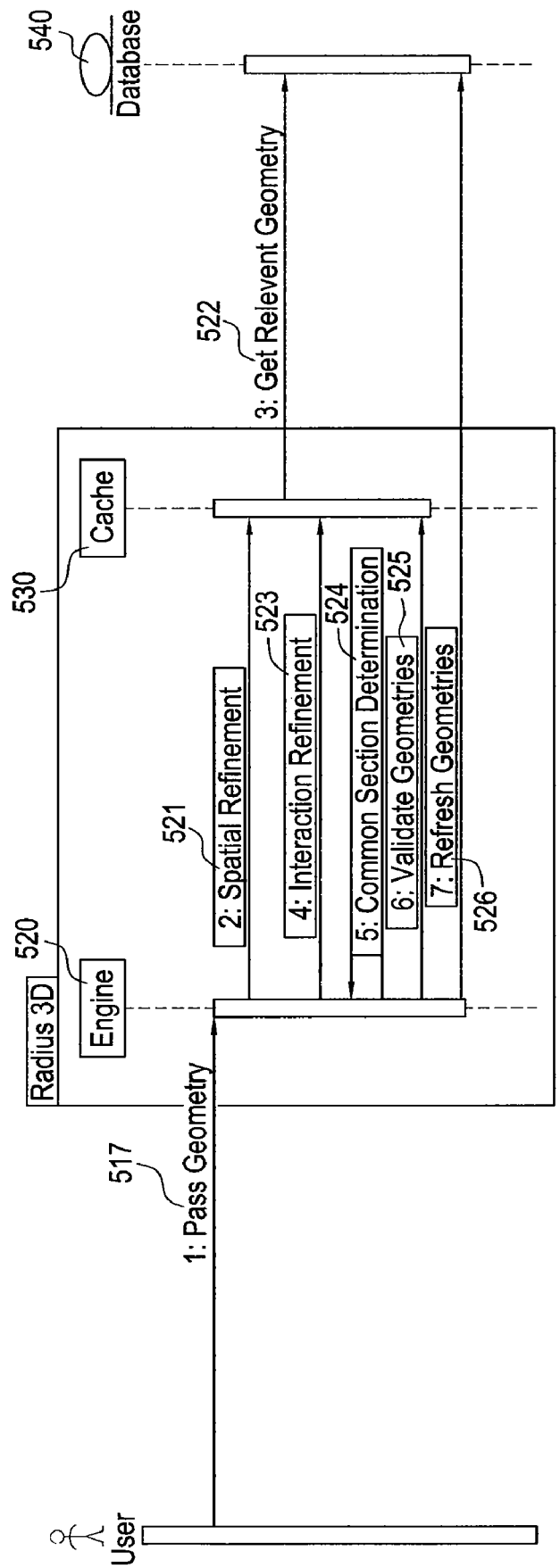
FIG. 5 is a functional process diagram of an implementation of a 3D topology builder using a smart client with an internal topology storage model, in accordance with an embodiment of the present invention.

FIG. 5 is a functional process diagram of an implementation of a 3D topology builder using a smart client with an internal topology storage model, in accordance with an embodiment of the present invention. In accordance with one or more embodiments of the present invention, in an application utilizing a "smart" client, the smart client could replace database 410 and the 3D topology engine 420 of FIG. 4. The use of a smart client to structure tables sequentially may be desirable in applications with high data volume. This approach would improve throughput by removing significant load off the database, thus allowing larger caches, and applying more resources to the task.

In FIG. 5, the smart client may pass 517 a user-supplied 3D feature geometry to a 3D topology engine 520 and the smart client may integrate the 3D feature geometry into the topology. The 3D topology engine 520 may be implemented using the specially created commercially available software, for example, but not limited to, the Radius Topology program provided by 1Spatial, from Cambridge, United Kingdom, as described above in relation to FIG. 4.

In FIG. 5, the 3D topology engine 520 may perform the following process, starting with a spatial refinement 521 of the user-supplied 3D feature geometry, using a cache 530. As part of the spatial refinement 521, relevant geometries may be requested 522 from a database 540 for comparison with the user-supplied 3D feature geometry to determine general spatial relationships between the features (i.e., topology primitives) in the geometries. These general spatial relationships may include actual interactions, as well as, interactions that fall within a predetermined or predefined tolerance range (i.e., distance from each other). Once the general spatial relationships between the topology primitives in the geometries is determined, their actual interactions may be refined 523 to determine which topology primitives have actual (i.e., concrete) spatial interactions or at least are within a specified tolerance range to permit them to be associated with each other. The common section of each topology primitive that is affected by each interaction may be individually determined 524. This determination 524 may be done using an iterative routine to check each topology primitive affected by each interaction.

In FIG. 5, after the shared geometry sections are determined 524, how the user-supplied 3D feature geometry fits into the existing topology in the database 540 may be validated 525 using a variety of rules to adjust the user-supplied 3D feature geometry and to ensure that all feature geometries are valid. The validation 525 may include the creation and storage of new topological primitives and binding the new topology primitives to both new and existing features. Once the geometries have been validated 525, the geometries may be refreshed 526 by saving the changes that have been made in the cache 530 to the database 540.

In accordance with one or more embodiments of the present invention, the logical process for building a 3D ISO 19107-compliant topology model from 3D feature geometry, generally, includes a series of individual steps, each of which depends on a set of core system capabilities. Of special importance are the design and database components for each of these capabilities, as the combination of these capabilities leads to a validated, self-consistent model that provides a 3D topology engine with broad capacity for re-use. The key process steps and the investigations outlined below were refined to verify a robust implementation approach.

Adding Features to the Model. In accordance with one or more embodiments of the present invention, the first step is to supply a new feature geometry for inclusion in the model. This assumes the availability of a suitable storage repository for 3D topology and geometry, such as described above in relation to FIGS. 2-5. In accordance with one or more embodiments of the present invention, the Oracle Spatial based geometry model may use an adaptation of the ISO 19125 Simple Feature Multi-Polygon geometry class, as supplied by Oracle in the 10g or 11g database, to store a simple triangulated surface. This may act as the principle generalized surface representation within the system. Similarly, the representation of point (0-dim) and line (I-dim) geometry uses the standard ISO Simple Feature classes for geometry storage. This capability underpins the spatial representation of both feature geometry and the geometric realization of topological primitives such as nodes, edges and faces. In general, solids are not explicitly realized but are defined by reference to their bounding shells, which are composed of faces realized by surface geometries. This is analogous to the conventional representation of a 2D polygon, which is by its boundary rings expressed using closed curve geometries.

The current version of the Oracle enterprise database (11g) will contain preliminary support for 3D geometry. This support will include a standardized data structure representing a triangulated irregular network (TIN) composed of a triangulated surface and a set of break lines, which constrain it. Also included will be an explicit solid modeling data structure based on a tetrahedral primitive. This completes the logical sequence of linearly interpolated geometry primitives within Oracle Spatial: Point (0-dim), LineString (1-dim), TIN (2-dim) and Tetrahedral Solid (3-dim).

Figure 6:
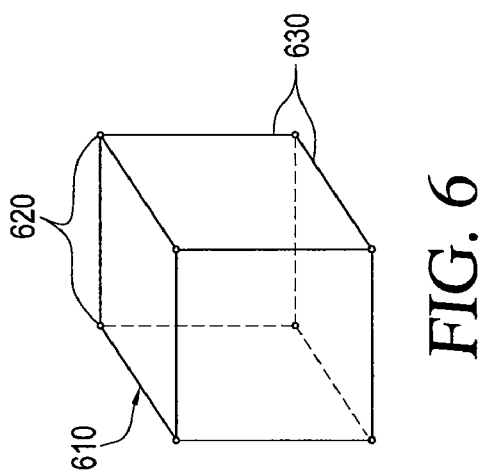
FIG. 6 is a 3D block diagram of a square object as represented in a 3D topology builder, in accordance with an embodiment of the present invention.

To illustrate how feature geometries may be used in embodiments of the present invention, a description of how some simple geometric shapes may be represented in the topology model might be helpful. FIG. 6 is a 3D block diagram showing a representation of 3D box, in accordance with one or more embodiments of the present invention. In FIG. 6, a first 3D box 610 is shown and defined by the node points 620 in its corners and the edges 630 between the node points defining that side. The first 3D box 610 is show as having six sides with each side being defined by four different node points and the edges drawn between the four node points. The first 3D box 610 is also defined to have a single face that covers all six sides of the 3D box 610, which means the first 3D box 610 is considered closed.

Figure 7:
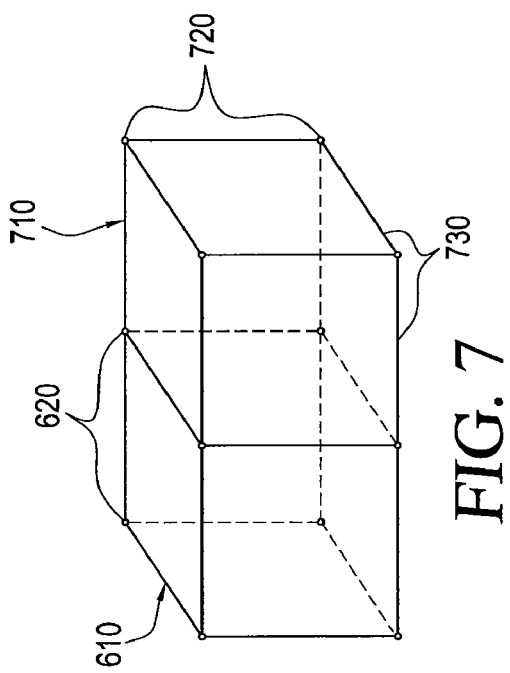
FIG. 7 is a 3D block diagram of the square object of FIG. 5 with an adjacent square object as represented in a 3D topology builder, in accordance with an embodiment of the present invention.

FIG. 7 is a 3D block diagram showing a representation of the 3D box in FIG. 6 with an adjacent second 3D box having been added, in accordance with one or more embodiments of the present invention. In FIG. 7, a second 3D box 710 is shown and defined by the node points in its corners 720 and the edges between the node points 730. The second 3D box 710 is show as having six sides with each side being defined by four different node points and the edges drawn between the four node points defining that side. However, the second 3D box 710 shares a common side with first 3D box 610 defined by four node points that also originally defined a right side of the first 3D box 610 in FIG. 6. The first 3D box 610 is still defined to have a single face, but now it only covers the five, non-common sides of the 3D box 610, which means the first 3D box 610 is considered open. Similarly, the second 3D box 710 is also defined to have a single face that also only covers the five, non-common sides of the 3D box 610, which means the second 3D box 610 is also considered open. As a result, the representation not only shows that the first 3D box 610 and the second 3D box 710 are adjacent, but that an opening exists between the two boxes. This can be vitally important information when trying to determine paths between objects, for example, but not limited to, adjacent buildings. Alternatively, in accordance with another embodiment of the present invention, the representation may show that although both boxes are adjacent and may or may not share nodes on a common side. Each box may have a single face that covers all six sides of the box, which means that both boxes are closed, so there would be no path between the boxes.

Figure 8:
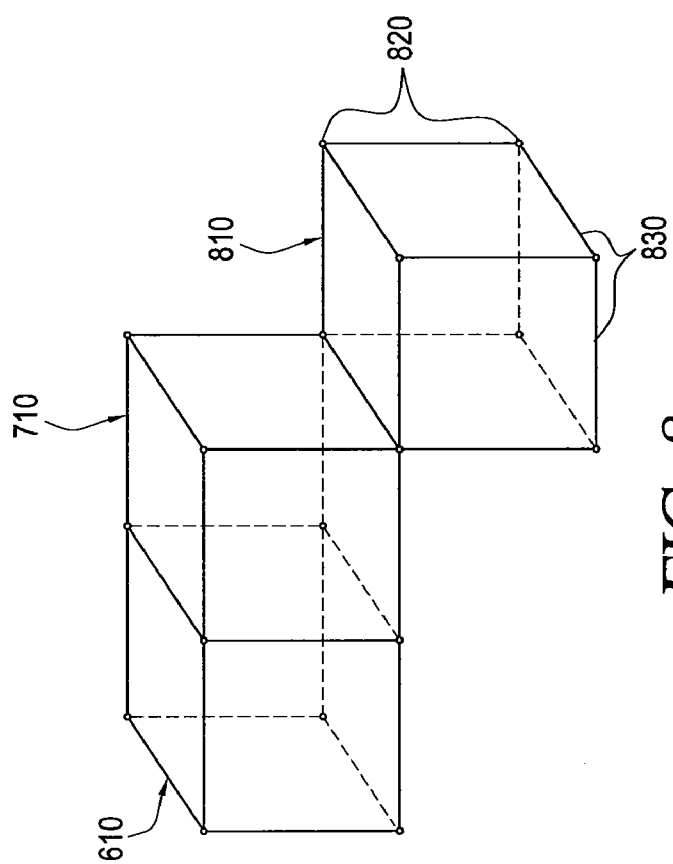
FIG. 8 is a 3D block diagram of the square objects of FIG. 6 with an adjacent square object as represented in a 3D topology builder, in accordance with an embodiment of the present invention.

FIG. 8 is a 3D block diagram showing a representation of the 3D boxes in FIG. 7 with an edge adjacent third 3D box having been added, in accordance with one or more embodiments of the present invention. In FIG. 8, a third 3D box 810 is shown and defined by the node points in its corners 820 and the edges between the node points 830. The third 3D box 810 is show as having six sides with each side being defined by four different node points and the edges drawn between the four node points defining that side. The third 3D box 810 is also defined to have a single face that covers all six sides of the third 3D box 810, which means the third 3D box 810 is considered closed. The third 3D box 810 shares a common edge with the second 3D box 710 defined by two node points that also originally defined a lower right side edge of the second 3D box 710 in FIG. 7. The first 3D box 610 and second 3D box 710 are still defined to each have a single face that covers the five, non-common sides of the 3D box, respectively and the first 3D box 610 and second 3D box 710 are still considered to be open. Although the third 3D box 810 and the second 3D box 710 are adjacent to each other along their common edge, they do not have an opening between them.

Refinement Query. In accordance with one or more embodiments of the present invention, after the feature geometry is presented to the system, the next step is to identify clearly any nearby features to which the presented geometry should be related through topology. This search is done in a hierarchical manner on each of the topology primitive tables in turn. The first pass is to identify all those objects that may be candidates for relation through topology. This set may later be refined with additional detailed geometric checks. A comparison of all possible 3D geometries present in the system (full table scan) is time-consuming and wasteful. Therefore, the conventional approach is to employ a spatial index structure, which can quickly narrow down to a small set of potentially spatially interacting objects. In accordance with one or more embodiments of the present invention, the query involves not only strict spatial interaction but also "near misses", i.e., objects that could be said to interact within some tolerance range. Therefore, when compiling the query the source geometry may be expanded by the amount of the greatest tolerance contained within topology (node formation) rules before searching for interaction candidates.

The Oracle database implemented in embodiments of the present invention, generally, contains an implementation of the hierarchical R-tree (rectangle tree) index, which is suitable for both 2D and 3D geometric data. In this structure, each geometry is recorded in the index against its Maximum Bounding HyperSolid (MBH) (a rectangle in 2D and a cuboid in 3D). Although the index can store 3D data, the query operators (e.g., intersects, overlaps etc.), which return feature rowsets, apply all their processing in 2D only (X-Y) with the exception of the filter query. The filter query simply returns all rows in which MBH intersects the MBH of the source geometry without checking whether the objects actually approach. This is useful when objects are small and compact (aspect ratios near 1:1). When objects are large or extended (e.g., a river) then the filter query may return a large number of distant objects, which need to be discarded.

Once the raw set of topology primitives that are candidates for snapping has been identified, it must be refined to the precise set in which concrete spatial interactions or prescribed "near misses" are known to be present. This involves a detailed set of computational geometry decompositions and checks. The first level involves checking the nearest distance of approach of the source and candidate target geometries. If the geometries actually intersect (for example, distance of approach =0.0), a modification of the topology will be required. If there is a near miss and the distance of approach lies within the specified set of topological tolerances, a modification will also be required. Otherwise, the candidate can be eliminated from the processing set. Later snapping may cause this set to be re-evaluated.

Topology Creation. Once the precise set of interacting topology primitives has been identified, the portion of each primitive that is affected by the interaction may be determined. In the simplest case, all of the primitives (for example, node, edge or face) may be reused within the supplied feature geometry, and modification of the primitive is not required. Only feature-to-primitive relationships are affected. More generally, the supplied feature geometry interacts with the stored topology primitives in a more complex fashion, and the existing primitives may be decomposed into fragments reflecting the individual geometry elements, each of which is shared by a single group of features. This process may involve a logical buffering step. For example, the supplied feature geometry may be buffered by the appropriate topological tolerance and intersected with each interacting primitive using Boolean combinations. The Boolean combinations require that some subtleties be addressed since pre-existing vertices and facets in the complex may be preferred over strict Boolean combination, which will typically result in the creation of many new vertices and facets. The result of this intersection is a new set of geometric objects that contain the realizations of the required, to-be topology primitives within the modified complex.

Once the shared geometry sections are known, the impact on the originally supplied feature geometry may be considered. It is not unusual that the supplied feature geometry does not marry perfectly into the existing topology complex. As a result, to determine the boundary conditions, it may be necessary to perform a matching of the supplied geometry with the topology complex. The section of the originally supplied geometry that corresponds to the new shared geometry section must be derived and replaced. This step may be considered a buffering and spatial query operation applied to the new buffered, shared geometry section intersecting back upon the source geometry. This proximity analysis, generally, yields a set of vertices, edges and facets, a subset of the originally supplied geometry that is equivalent to the new shared geometry section. Also identified is the critical region in which the new and old geometries mismatch (the boundary of the intersection region) and in which adjustment of the supplied geometry is required. This is commonly referred to as "snapping". The original geometry is modified to exclude the region corresponding to the shared geometry section and its boundary adjusted to match the boundary of the new shared geometry section.

This sequence of operations depends heavily on the Boolean operators for geometry. Boolean or logical operators may be used to determine the point set intersection (AND), union (OR), or disjunction (NOT) of two discrete geometries.

Once the new (adjusted) and modified sections of geometry are known, topology primitives storing the shared geometry may be created and existing ones updated. This may be done using the established storage model for database schema and conventional SQL for database access.

Update Feature Geometry. Using a stored topology model, the geometry of a feature may be represented by referring to many primitive objects, which together form the feature geometry. Typically, methods are provided within the system to generate the geometry from the stored references and the geometries within the primitives. For complex, dense or extended features, this calculation may be costly, and this has an impact on operations in which the access to geometric information is time critical (e.g., map redraw). A frequent solution is to use geometry caching, implemented either as a server-side or client-side cache. In the case of a server side cache, as the topology primitives are modified, the feature geometries, which depend upon these primitives, also may be updated to include the synchronized version obtained via the feature geometry method described above. This technique has proved highly effective in the case of a 2.5D topology engine (Radius Topology) as a way of accelerating both explicit topological as well as normal geometric queries, at the expense of some redundant storage.

Feature to Primitive Binding. When all necessary primitives have been created, bindings of the new topology complex back to both new and existing features may be established to maintain navigability for later spatial and topological query. This involves updating the tables that store the feature-to-primitive relationships. Use of the 3D topology model of FIG. 2 clearly adds a new dimension to the overall complexity of the modeling, and this will have an impact on the overhead of describing features in an explicitly topological way. However, while it is recognized that the world has some important 3D aspects, people are predominantly surface dwellers, so much of the feature capture, modeling and navigation is performed by reference to surfaces, in accordance with at least one embodiment of the present invention. Many data capture methodologies (e.g., LIDAR) also yield primarily exterior 3D surface information. From this it should be clear that the complexity added to the modeling lies somewhere between conventional 2D surface representation and fully volumetric 3D representation in which every voxel of space in horizontal as well as vertical direction is equally complex.

Transactional Consistency. A key design principle of the 3D topology engine is that the entire system, consisting of feature geometry, topology primitives, and boundary relationships, moves in discrete steps from one consistent and valid state to another. At no point does the database contain committed data in an intermediate or partially valid state. The key transaction is the feature update. Each change to a feature geometry triggers the cascade of calculations and modifications described above. These atomic changes may generate a significant quantity of temporary information to be stored prior to committing, especially when the change affects the universal solid in 3D. This effect is already well understood in 2D where changes affecting the universal face, or any other large face, may consume a significant quantity of system resources.

The following provides a description of how a new geometry can be added/created or an existing geometry can be modified.

Adding Features. When the user creates a new geometry or modifies an existing geometry, triggers on the feature tables initiate the creation and updating of the underlying topology. To avoid the introduction of a mutating table, the triggers create a log indicating that the geometry has been updated and a separate log indicating that the topology needs to be updated. The triggers then query the log table to find created and modified geometries and send the collection of geometries to the 3D topology engine for topology creation.

Refinement Query. After the geometry is in the topology engine, the candidate topology primitives to which the geometry is to be compared may be identified. The topology engine, generally, queries the cache for all data within a specified spatial buffer defined by the Minimum Bounding Box (MBB) of the original geometry. The cache returns the requisite geometries to the topology engine. If the cache does not contain the requisite geometry information, the cache queries the database for topology primitives before returning the geometries. Storing the data in the cache increases performance by reducing the number of queries to the database. The second refinement query uses algorithms to determine which, if any, topology primitives interact with the original geometry. Topology primitives that are within a specified topological tolerance cause a modification of the topology. In general, topology primitives outside the tolerances can be ignored.

Topology Creation. After determining the candidate topology primitives, the geometry in question may be compared against each topology primitive in the set. The original geometry may be decomposed into points, lines, and surfaces, which may be compared independently. Using the Boolean operators, touch point, and approach point algorithms, the topology of the original geometry may be calculated, and the topology primitives in the set may be updated. The topology primitives may then be stored back into the cache, using existing topology primitives where appropriate. Topological tolerances may require that coordinates be snapped to existing topology or that existing topology be snapped to the newly create topology. These snapping tolerances force the system to return to the refinement queries because the original geometry may have changed.

Update Feature Geometry. Prior to storing changes in the database, the modified feature geometries from the topology primitives may be stored in the cache. The purpose is to validate the topology primitive results and ensure that no feature geometries have been broken. If problems are identified, the changes can be discarded before they have been stored in the database, avoiding the requirement for database rollback. To increase database performance and avoid the cost of rebuilding geometry from topological primitives, generally, the feature schema stores a copy of the created geometry. Under this scenario, the geometry column of the necessary feature rows is updated.

Feature to Primitive Binding. After calculating the topology primitives and validating that geometries are properly created, the newly created and modified topology primitives may be stored in the topology model in FIG. 2. In FIG. 2, the topology tables include the node table 225, the edge table 220, the face table 215 and the solid table 210. These four tables provide the storage for the geometry of the topological primitives. In Oracle 11g, the SDO_GEOMETRY type will provide the storage. Nodes and edges maintain a reference to the topological primitive in which they are isolated, which may or may not be null. Topological primitives, generally, can only be isolated in other primitives that are two orders higher (or more) in dimensionality. Solids, generally, do not store geometry explicitly, because the solid geometry is completely specified by the bounding faces.

Topology join tables. The topology join tables in FIG. 2 may include the Node2Edge table 230, the Edge2Face table 235, and the Face2Solid table 240. These three tables identify the connectivity of the topological primitives one dimension apart from each other. The orientation must be either positive or negative. Topological primitives that are completely contained will have two entries in the join table, one with positive orientation and one with negative orientation. For example, an edge may contain two nodes, a start (positive orientation) and an end (negative orientation) node. Primitives forming a boundary, generally, only appear once. A positive orientation on such a primitive signifies the outer boundary while a negative orientation signifies an inner boundary.

Topology to geometry join tables. The topology to join tables in FIG. 2 may include the Point2Node table 250, the Curve2Edge table 255, the Surface2Face table 260, and the Volume2Solid table 265. These four tables identify the connectivity between topology primitives and feature objects. The primary key of the Geometry table (described below) corresponds to the first column of each join table. A feature object will have one entry for each topological primitive. For curves, the sequence indicates the order in which the edges may be connected. This allows edges to be inserted without extensive restructuring. The orientation indicates whether the primitive may be used in a positive or negative direction.

Geometry table 205, in FIG. 2, This table represents the storage of feature objects with a spatial attribute. The geometry type may be an enumeration that indicates the dimensionality of the geometry as well as whether it is simple, an aggregate, or a complex. Queries use this enumeration to identify topology to geometry join table(s) to search in order to retrieve the topology. The table geometry ID 206, in FIG. 2, is an index into a metadata table. It contains the feature table/column combination associated with each feature object.

Transactional Consistency. Several issues associated with ensuring transactional consistency are described below and relate to FIG. 5. If data (that is, primitives) are modified before the calculation is complete, incorrect results may be generated. For example, if two processes attempt to add crossing lines at exactly the same time, they will not see the results of the other. As a result, two intersecting edges will be incorrectly produced, rather than four edges ending at the intersection point. To avoid flushing these incorrect results into the database, there are two options: pessimistic locking and optimistic locking.

Pessimistic locking places database locks on anything read to prevent external modifications to those rows. Since there are no means of locking a spatial region against the insertion of additional rows, additional data needs to be stored to provide a row that can be locked. The MBB of the query region may be inserted in a table in an autonomous transaction. In situations with a significant number of conflicts, pessimistic locking is effective in safeguarding against external modifications because it serializes the problem. However, pessimistic locking consumes significant database resources and results in a sequential process in which only one process or person at a time can make updates. Unless carefully implemented, pessimistic locking can lead to deadlocks.

Optimistic locking reads the data and assumes it will not change. This is enforced by an explicit check. If there is a conflict, the process may discard the calculations and try again. In systems that anticipate low conflict levels, optimistic locking is the more effective approach. It consumes fewer database resources, but it is difficult to implement.

As a result, some form of pessimistic lock is, generally, required for topology because multiple tables need to be updated. However, this is only required in the final steps of the process in which the data needs to be written back to the database. For earlier steps in the process fewer conflicts are anticipated, and it is feasible to use optimistic locking to reduce the computation time.

Incorrect results may be avoided by initially obtaining a transaction number before performing any other query. Before flushing, the transaction number is incremented, and the MBB of the affected region is stored in a locking table by an autonomous transaction so that other processes may see this MBB. The row with the MBB, generally, is locked, effectively preventing concurrent writes to the region. If the transaction number is not the expected value, it generally means that other updates have occurred and a check for overlapping MBBs is required. If an overlapping MBB occurs, the second change must be abandoned. Once the data is flushed and the user's application commits the changes, the locks generated in the database may be released. The aim is to lock rows in the database for as short a time as possible.

Open Source Components. Open source components may be used to provide the following operations: boundary retrieval, coordinate shifts, spatial tolerance querying, approach and touch point algorithms, and Boolean operators. For operations that are not available the possibility of expanding the libraries to include the missing operators was assessed. Boundary retrieval allows work on the geometry shells of features that are one dimensionality lower than the original geometry, simplifying the algorithms necessary for computation. Generally, the initial refinement of topology primitives requires the use of a spatial tolerance query. While this functionality is available in Oracle, it is desirable to have similar functionality in the 3D topology builder cache in order to improve performance.

Approach and touch point algorithms provide two functions, the ability to refine the set of topology primitives that interact and the ability, along with the ability to shift coordinates, to implement snapping/topological tolerances.

The Boolean operators include union (Boolean OR), difference (Boolean NOT), and intersection (Boolean AND). The union operator returns a geometry representing the combination of the two original geometries. The difference operator returns the portion of the first geometry that does not intersect with the second geometry. The intersection operator returns a geometry representing where the original two geometries are coincident.

Computational Geometry Algorithms Library. The Computational Geometry Algorithms Library (CGAL) is available under the Lesser General Public (LGP) and Q Public (QPL) licenses. The creators of CGAL also provide a commercial version called GeometryFactory. CGAL aims to provide efficient and accessible geometric algorithms. Users of CGAL include projects in the fields of computer aided design, geographic information systems, molecular biology, and computer graphics. CGAL has explicit functionality for boundary retrieval and Boolean operators (and, or, not) built into a 3D object, Nef Polyhedra, which models a volumetric geometry and a 2D object, Nef Polygons. CGAL provides both two- and three-dimensional spatial searching using a region definition. CGAL stores the Nef Polygon and Polyhedra objects as a collection of points, lines, surfaces, and tetrahedrons. Each of these building blocks has the ability to use a transformation to shift the original block. This allows the specification of the small building blocks that require a change and update these objects separately. CGAL provides the ability to compute the distance between the convex hulls of two point sets. CGAL uses this functionality for collision detection. However, this functionality would require expansion in order to create functionality similar to an approach point algorithm.

GNU Triangulated Surface Library. The GNU Triangulated Surface Library (GTS) is available under the LGP license. GTS developers emphasize performance of operations due to the initial goal of providing a simple library for dealing with 3D computational meshes. GTS is currently used in the computer-aid design and aerospace fields. GTS stores objects as a list of the boundary objects, i.e., a volume is stored as a collection of surfaces that are closed. This object definition provides simple retrieval of an objects boundary. Since GTS does not store volumetric geometry, it has Boolean operations that work only with 3D surfaces. These operators are still sufficient since we are not currently storing the geometric representation of a solid. GTS provides functionality to compare the distances between points, lines, and surfaces objects with a given geometry object. This feature would provide a search similar to approach point and could be extended to implement a portion of the snapping capabilities. GTS provides the ability to transform points but not geometry of a higher dimensionality. GTS does not provide extensive spatial searching capabilities.

Open CASCADE. Open CASCADE is available under a public license similar to the LGP license and which can be found on Open CASCADE's website. Open CASCADE is currently used in the fields of aerospace, computer-aided design, and geographic information systems. Open CASCADE defines geometric objects hierarchically with each higher dimension holding alike to the boundary objects of lower dimension. This allows the retrieval of the boundary very easily and provides an efficient path to retrieve boundaries of the boundary objects. Open CASCADE's Boolean operators work with all three dimensions including volumetric geometries. Open CASCADE provides the ability to apply a number of translations to each dimension of geometry. The operations used in these geometry manipulations provide a starting point for developing move coordinates functionality necessary for topological snapping. Open CASCADE does not specify support for additional spatial searching or the ability to test for features that approach another feature.

Oracle 11g. The Oracle Corporation provides data storage and data administration through its well know database interface. Oracle has provided the storage of geometric features since their Oracle 8i release in 1998. Oracle has added capabilities for geometries in each release since 1998. Oracle 11g currently provides a spatial filter operator that works in the full three dimensions. Oracle 11g also has support for volumetric storage via tetrahedral definition and a new type to store triangulated surfaces. The 3D data may be stored in the Oracle 11g database in order to use the spatial filter provided by Oracle.

In accordance with an embodiment of the present invention, a method for integrating a three-dimensional feature geometry into a three-dimensional topology in a database, the method including: adding a three-dimensional feature geometry into a table in a database; passing the three-dimensional feature geometry to a three-dimensional topology engine and a cache; performing a spatial refinement to determine a number of topology primitives in an existing three-dimensional geometry in the database that are near to topology primitives of the three-dimensional feature geometry; and obtaining a number of relevant nearby spatial topology primitives in the geometries using a spatial search. The method may further include performing an interaction refinement to determine a precise set of the number of relevant nearby topology primitives in the geometries that have spatial interactions; determining a common section of each topology primitive in the number of relevant nearby topology primitives that have spatial interactions; validating that the three-dimensional feature geometry fits into the three-dimensional topology table using a plurality of rules; and saving the validated three-dimensional feature geometry in the database.

In accordance with an embodiment of the present invention, a machine readable medium having stored thereon a plurality of machine-executable instructions for performing a method for integrating the three-dimensional feature geometry into the three-dimensional topology in a database, the method including: adding a three-dimensional feature geometry into a table in a database; passing the three-dimensional feature geometry to a three-dimensional topology engine and a cache; performing a spatial refinement to determine a number of topology primitives in an existing three-dimensional geometry in the database that are near to topology primitives of the three-dimensional feature geometry; and obtaining a number of relevant nearby spatial topology primitives in the geometries using a spatial search. The method further including: performing an interaction refinement to determine a precise set of the number of relevant nearby topology primitives in the geometries that have spatial interactions; determining a common section of each topology primitive in the number of relevant nearby topology primitives that have spatial interactions; validating that the three-dimensional feature geometry fits into the three-dimensional topology table using a plurality of rules; and saving the validated three-dimensional feature geometry in the database.

In accordance with an embodiment of the present invention, a system for integrating a three-dimensional feature geometry into a three-dimensional topology in a database, the system including means for adding a three-dimensional feature geometry into a table in a database; means for passing the three-dimensional feature geometry to a three-dimensional topology engine and a cache; and means for performing a spatial refinement to determine a number of topology primitives in an existing three-dimensional geometry in the database that are near to topology primitives of the three-dimensional feature geometry. The system further including means for obtaining a number of relevant nearby spatial topology primitives in the geometries using a spatial search; means for performing an interaction refinement to determine a precise set of the number of relevant nearby topology primitives in the geometries that have spatial interactions; and means for determining a common section of each topology primitive in the number of relevant nearby topology primitives that have spatial interactions. The system still further including means for validating that the three-dimensional feature geometry fits into the three-dimensional topology table using a plurality of rules; and means for saving the validated three-dimensional feature geometry in the database.

In accordance with an embodiment of the present invention, a system for integrating a three-dimensional feature geometry into a three-dimensional topology in a database may include a server with a three-dimensional topology engine and a relational data base management system in communication with the three-dimensional topology engine and the relational data base management system including a spatial extension; and a database storage system in communication with the relational data base management system, the database including a plurality of three-dimensional topology tables, a plurality of three-dimensional topology rules, business data, and three-dimensional spatial data. The system may also include means for adding a three-dimensional feature geometry into a table in a database; means for passing the three-dimensional feature geometry to a three-dimensional topology engine and a cache; and means for performing a spatial refinement to determine a number of topology primitives in an existing three-dimensional geometry in the database that are near to topology primitives of the three-dimensional feature geometry. The system may still further include means for obtaining a number of relevant nearby spatial topology primitives in the geometries using a spatial search; means for performing an interaction refinement to determine a precise set of the number of relevant nearby topology primitives in the geometries that have spatial interactions; means for determining a common section of each topology primitive in the number of relevant nearby topology primitives that have spatial interactions; means for validating that the three-dimensional feature geometry fits into the three-dimensional topology table using a plurality of rules; and means for saving the validated three-dimensional feature geometry in the database.

In accordance with an embodiment of the present invention, a system for integrating a three-dimensional feature geometry into a three-dimensional topology in a database may include a server with a three-dimensional topology engine and a relational data base management system in communication with the three-dimensional topology engine and the relational data base management system including a spatial extension; and a database storage system in communication with the relational data base management system, the database including a plurality of three-dimensional topology tables, a plurality of three-dimensional topology rules, business data, and three-dimensional spatial data. The system may further include a machine readable medium having stored thereon a plurality of machine-executable instructions for performing a method for integrating the three-dimensional feature geometry into the three-dimensional topology in a database, the method including adding a three-dimensional feature geometry into a table in a database; passing the three-dimensional feature geometry to a three-dimensional topology engine and a cache; performing a spatial refinement to determine a number of topology primitives in an existing three-dimensional geometry in the database that are near to topology primitives of the three-dimensional feature geometry; and obtaining a number of relevant nearby spatial topology primitives in the geometries using a spatial search. The method would further include performing an interaction refinement to determine a precise set of the number of relevant nearby topology primitives in the geometries that have spatial interactions; determining a common section of each topology primitive in the number of relevant nearby topology primitives that have spatial interactions; validating that the three-dimensional feature geometry fits into the three-dimensional topology table using a plurality of rules; and saving the validated three-dimensional feature geometry in the database.

While the present invention has been described in conjunction with a number of embodiments, the invention is not to be limited to the description of the embodiments contained herein, but rather is defined by the claims appended hereto and their equivalents. It is further evident that many alternatives, modifications, and variations would be or are apparent to those of ordinary skill in the applicable arts. Accordingly, all such alternatives, modifications, equivalents, and variations that are within the spirit and scope of this invention.

What is claimed is:

1. A method for integrating a three-dimensional feature geometry into a three-dimensional topology in a database, the method comprising:
adding a three-dimensional feature geometry into a table in a database;
passing the three-dimensional feature geometry to a three-dimensional topology engine and a cache;
performing a spatial refinement to determine a number of topology primitives in an existing three-dimensional geometry in the database that are near to topology primitives of the three-dimensional feature geometry;
obtaining a number of relevant nearby spatial topology primitives in the geometries using a spatial search;
performing an interaction refinement to determine a precise set of the number of relevant nearby topology primitives in the geometries that have spatial interactions;
determining a common section of each topology primitive in the number of relevant nearby topology primitives that have spatial interactions;
validating that the three-dimensional feature geometry fits into the three-dimensional topology table using a plurality of rules; and saving the validated three-dimensional feature geometry in the database.

2. The method of claim 1 wherein the performing a spatial refinement comprises:
performing a three-dimensional spatial search of the geometries to determine which topology primitives in each of the geometries have actual spatial interactions and possible spatial interactions within a predetermined tolerance range.

3. The method of claim 2 wherein the performing a spatial refinement further comprises:
using a spatial index structure to select a set of potentially spatially interacting topology primitives between the geometries.

4. The method of claim 1 wherein the performing an interaction refinement to determine which topology primitives in each of the geometries have spatial interactions comprises:
performing a three-dimensional spatial search of the geometries to determine which topology primitives in each of the geometries have actual spatial interactions and which topology primitives in each of the geometries are within a predetermined distance of each other.

5. The method of claim 1 wherein the determining a common section of each topology primitive in the number of relevant nearby topology primitives that have spatial interactions comprises:
determining paired points at which the two geometries come within a predetermined distance of each other; and
determining common three-dimensional regions of intersection between the two geometries.

6. The method of claim 5 wherein the determining paired points at which the two geometries come within a predetermined distance of each other comprises:
using an approach point algorithm to determine the paired points at which the two geometries come within the predetermined distance of each other.

7. The method of claim 5 wherein the determining common three-dimensional regions of intersection between the two geometries comprises:
using a touch point algorithm to determine the common three-dimensional regions of intersection between the two geometries.

8. The method of claim 5 wherein the determining a common section of each topology primitive in the number of relevant nearby topology primitives that have spatial interactions further comprises:
using Boolean operators to determine the common section of each topology primitive in the number of relevant nearby topology primitives that have spatial interactions.

9. The method of claim 1 wherein the validating that the three-dimensional feature geometry fits into the three-dimensional topology table using a plurality of rules comprises:
using the plurality of rules to replace the three-dimensional feature geometry with new topology primitives to match the three-dimensional topology table or modify existing topology primitives;
storing the new topology primitives; and
binding the new topology primitives to the three-dimensional feature geometry and the existing three-dimensional geometry.

10. The method of claim 1 wherein the saving the validated three-dimensional feature geometry in the database comprises:
saving the validated three-dimensional feature geometry from the cache to the database.

11. A machine readable medium having stored thereon a plurality of machine-executable instructions for performing a method for integrating the three-dimensional feature geometry into the three-dimensional topology in a database, the method comprising:
adding a three-dimensional feature geometry into a table in a database;
passing the three-dimensional feature geometry to a three-dimensional topology engine and a cache;
performing a spatial refinement to determine a number of topology primitives in an existing three-dimensional geometry in the database that are near to topology primitives of the three-dimensional feature geometry;
obtaining a number of relevant nearby spatial topology primitives in the geometries using a spatial search;
performing an interaction refinement to determine a precise set of the number of relevant nearby topology primitives in the geometries that have spatial interactions;
determining a common section of each topology primitive in the number of relevant nearby topology primitives that have spatial interactions;
validating that the three-dimensional feature geometry fits into the three-dimensional topology table using a plurality of rules; and
saving the validated three-dimensional feature geometry in the database.

12. The machine-readable medium of claim 11 wherein the performing a spatial refinement comprises:
performing a three-dimensional spatial search of the geometries to determine which topology primitives in each of the geometries have actual spatial interactions and possible spatial interactions within a predetermined tolerance range.

13. The machine-readable medium of claim 12 wherein the performing a spatial refinement further comprises:
using a spatial index structure to select a set of potentially spatially interacting topology primitives between the geometries.

14. The machine-readable medium of claim 11 wherein the performing an interaction refinement to determine which topology primitives in each of the geometries have spatial interactions comprises:
performing a three-dimensional spatial search of the geometries to determine which topology primitives in each of the geometries have actual spatial interactions and which topology primitives in each of the geometries are within a predetermined distance of each other.

15. The machine-readable medium of claim 11 wherein the determining a common section of each topology primitive in the number of relevant nearby topology primitives that have spatial interactions comprises:
determining paired points at which the two geometries come within a predetermined distance of each other; and
determining common three-dimensional regions of intersection between the two geometries.

16. The machine-readable medium of claim 15 wherein the determining paired points at which the two geometries come within a predetermined distance of each other comprises:
using an approach point algorithm to determine the paired points at which the two geometries come within the predetermined distance of each other.

17. The machine-readable medium of claim 15 wherein the determining common three-dimensional regions of intersection between the two geometries comprises:
using a touch point algorithm to determine the common three-dimensional regions of intersection between the two geometries.

18. The machine-readable medium of claim 15 wherein the determining a common section of each topology primitive in the number of relevant nearby topology primitives that have spatial interactions further comprises:
  using Boolean operators to determine the common section of each topology primitive in the number of relevant nearby topology primitives that have spatial interactions.

19. The machine-readable medium of claim 11 wherein the validating that the three-dimensional feature geometry fits into the three-dimensional topology table using a plurality of rules comprises:
  using the plurality of rules to replace the three-dimensional feature geometry with new topology primitives to match the three-dimensional topology table or modify existing topology primitives;
  storing the new topology primitives; and
  binding the new topology primitives to the three-dimensional feature geometry and the existing three-dimensional geometry.

20. The machine-readable medium of claim 11 wherein the saving the validated three-dimensional feature geometry in the database comprises:
  saving the validated three-dimensional feature geometry from the cache to the database.

21. A system for integrating a three-dimensional feature geometry into a three-dimensional topology in a database, the system comprising:
  means for adding a three-dimensional feature geometry into a table in a database;
  means for passing the three-dimensional feature geometry to a three-dimensional topology engine and a cache;
  means for performing a spatial refinement to determine a number of topology primitives in an existing three-dimensional geometry in the database that are near to topology primitives of the three-dimensional feature geometry;
  means for obtaining a number of relevant nearby spatial topology primitives in the geometries using a spatial search;
  means for performing an interaction refinement to determine a precise set of the number of relevant nearby topology primitives in the geometries that have spatial interactions;
  means for determining a common section of each topology primitive in the number of relevant nearby topology primitives that have spatial interactions;
  means for validating that the three-dimensional feature geometry fits into the three-dimensional topology table using a plurality of rules; and
  means for saving the validated three-dimensional feature geometry in the database.

22. A system for integrating a three-dimensional feature geometry into a three-dimensional topology in a database, the system comprising:
  a server with a three-dimensional topology engine and a relational data base management system in communication with the three-dimensional topology engine and the relational data base management system including a spatial extension;
  a database storage system in communication with the relational data base management system, the database including a plurality of three-dimensional topology tables, a plurality of three-dimensional topology rules, business data, and three-dimensional spatial data;
  means for adding a three-dimensional feature geometry into a table in a database;
  means for passing the three-dimensional feature geometry to a three-dimensional topology engine and a cache;
  means for performing a spatial refinement to determine a number of topology primitives in an existing three-dimensional geometry in the database that are near to topology primitives of the three-dimensional feature geometry;
  means for obtaining a number of relevant nearby spatial topology primitives in the geometries using a spatial search;
  means for performing an interaction refinement to determine a precise set of the number of relevant nearby topology primitives in the geometries that have spatial interactions;
  means for determining a common section of each topology primitive in the number of relevant nearby topology primitives that have spatial interactions;
  means for validating that the three-dimensional feature geometry fits into the three-dimensional topology table using a plurality of rules; and
  means for saving the validated three-dimensional feature geometry in the database.

23. The method of claim 22 wherein the plurality of three-dimensional topology tables comprises:
  a plurality of topological tables to define topological features of the three-dimensional topology;
  a first plurality of relationship tables to define relationships between the topological features in the plurality of topological tables; and
  a second plurality of relationship tables to define relationships between the topological features in the plurality of topological tables and features in a geometry library.

24. The method of claim 23 wherein the plurality of topological tables to define topological features of the three-dimensional topology comprises:
  a solid table;
  a face table;
  an edge table; and
  a node table.

25. The method of claim 24 wherein the first plurality of relationship tables to define relationships between the topological features in the plurality of topological tables comprises:
  a face to solid table;
  an edge to face table; and
  a node to solid table.

26. The method of claim 25 wherein the second plurality of relationship tables to define relationships between the topological features in the plurality of topological tables and features in the geometry library comprises:
  a point to node table;
  a curve to edge table;
  a surface to face table; and
  a volume to solid.

27. A system for integrating a three-dimensional feature geometry into a three-dimensional topology in a database, the system comprising:
  a server with a three-dimensional topology engine and a relational data base management system in communication with the three-dimensional topology engine and the relational data base management system including a spatial extension;
  a database storage system in communication with the relational data base management system, the database including a plurality of three-dimensional topology tables, a plurality of three-dimensional topology rules, business data, and three-dimensional spatial data; and a machine readable medium having stored thereon a plurality of machine-executable instructions for performing a method for integrating the three-dimensional feature geometry into the three-dimensional topology in a database, the method comprising:
adding a three-dimensional feature geometry into a table in a database;
passing the three-dimensional feature geometry to a three-dimensional topology engine and a cache;
performing a spatial refinement to determine a number of topology primitives in an existing three-dimensional geometry in the database that are near to topology primitives of the three-dimensional feature geometry;
obtaining a number of relevant nearby spatial topology primitives in the geometries using a spatial search;
performing an interaction refinement to determine a precise set of the number of relevant nearby topology primitives in the geometries that have spatial interactions;
determining a common section of each topology primitive in the number of relevant nearby topology primitives that have spatial interactions;
validating that the three-dimensional feature geometry fits into the three-dimensional topology table using a plurality of rules; and
saving the validated three-dimensional feature geometry in the database.

28. The system of claim 27 wherein the plurality of three-dimensional topology tables comprises:
a plurality of topological tables to define topological features of the three-dimensional topology;
a first plurality of relationship tables to define relationships between the topological features in the plurality of topological tables; and
a second plurality of relationship tables to define relationships between the topological features in the plurality of topological tables and features in a geometry library.

29. The system of claim 28 wherein the plurality of topological tables to define topological features of the three-dimensional topology comprises:
a solid table;
a face table;
an edge table; and
a node table.

30. The system of claim 29 wherein the first plurality of relationship tables to define relationships between the topological features in the plurality of topological tables comprises:

a face to solid table including a face identification field pointer to a face identification field in the face table, a solid identification field pointer to a solid identification field in the solid table, and a face to solid orientation field to identify the orientation of the face in the solid;
an edge to face table including an edge identification field pointer to an edge identification field in the edge table, a face identification field pointer to the face identification field in the face table, and an edge to face orientation field to identify the orientation of the edge in the face; and
a node to solid table including a node identification field pointer to a node identification field in the node table, a solid identification field pointer to the solid identification field in the solid table, and a node to solid orientation field to identify the orientation of the node in the solid.

31. The system of claim 30 wherein the second plurality of relationship tables to define relationships between the topological features in the plurality of topological tables and features in the geometry library comprises:
a point to node table including a point identification field pointer to a geometry identification field in the geometry library, and a node identification field pointer to a node identification field in the node table;
a curve to edge table including a curve identification field pointer to the geometry identification field in the geometry library, an edge identification field pointer to an edge identification field in the edge table, a sequence field to identify the sequence of the curve in the edge, and a curve to edge orientation field to identify the orientation of the node in the solid;
a surface to face table including a surface identification field pointer to the geometry identification field in the geometry library, the face identification field pointer to the face identification field in the edge table, and a surface to face orientation field to identify the orientation of the surface in the face; and
a volume to solid table including a volume identification field pointer to the geometry identification field in the geometry library, the solid identification field pointer to the solid identification field in the solid table, and a volume to solid orientation field to identify the orientation of the surface in the face.

* * * * *

UNITED STATES PATENT AND TRADEMARK OFFICE
CERTIFICATE OF CORRECTION

PATENT NO. : 7,805,463 B2 Page 1 of 1
APPLICATION NO. : 12/117576
DATED : September 28, 2010
INVENTOR(S) : Timothy D. C. Bevan, Michael J. Martin and Paul J. Watson It is certified that error appears in the above-identified patent and that said Letters Patent is hereby corrected as shown below:

Title page, Item (73)    Assignees are as follows:

Laser-Scan, Inc., Sterling, VA (US)
                                      1Spatial, Cambridge (GB)

Signed and Sealed this

Thirtieth Day of November, 2010

David J. Kappos
*Director of the United States Patent and Trademark Office*